United States Patent [19]

Gage

[11] Patent Number: 4,838,314

[45] Date of Patent: Jun. 13, 1989

[54] SECONDARY HYDRAULIC STEERING SYSTEM

[75] Inventor: Douglas M. Gage, Dubuque, Iowa

[73] Assignee: Deere & Company, Moline, Ill.

[21] Appl. No.: 257,257

[22] Filed: Oct. 12, 1988

[51] Int. Cl.[4] .............................................. F15B 13/10
[52] U.S. Cl. ................... 137/625.24; 60/384; 60/468; 91/467
[58] Field of Search ............ 60/384, 468; 91/467; 137/625.24

[56] References Cited

U.S. PATENT DOCUMENTS

| | | | |
|---|---|---|---|
| 4,109,679 | 8/1978 | Johnson | 137/625.24 X |
| 4,759,182 | 7/1988 | Haarstad | 60/384 |
| 4,781,219 | 11/1988 | Haarstad et al. | 60/384 X |

*Primary Examiner*—Gerald A. Michalsky

[57] ABSTRACT

The secondary steering system comprises a structure to prevent the reverse flow of fluid in the fluid bypass path around the fluid meter and provide a supply line from the reservoir to the pressurized fluid line. The supply line supplies hydraulic fluid to the fluid meter of the controller when hydraulic pressure has been lost. The fluid meter can then be manually driven by the operator to supply pressurized hydraulic fluid to the steering cylinders.

6 Claims, 4 Drawing Sheets

SECONDARY HYDRAULIC STEERING SYSTEM

BACKGROUND OF THE INVENTION

1. Field of the Invention

The invention is directed to a secondary hydraulic steering system for steering a large work vehicle when hydraulic pressure is lost.

2. Description of the Prior Art

Large articulated work vehicles, such as four-wheel drive loaders, four-wheel drive tractors, logging skidders, and other vehicles, use hydraulic systems to articulate and steer the vehicle. Such systems are well known in the art, as disclosed in U.S. Pat. No. 4,109,679. Typically these systems are provided with a hydraulic controller which is coupled to a steering wheel and in response to manipulation of the steering wheel controls the output of pressurized hydraulic fluid to steering cylinders. The hydraulic controller typically comprises a fluid meter and valve structure that are operatively coupled to one another by a mechanical follow-up connection, the fluid meter being formed from a gerotor.

To assure continued steerability of a large work vehicle when hydraulic pressure is lost, these vehicles maybe provided with secondary hydraulic pressure systems. One such secondary hydraulic pressure system comprises an electrically powered pump that supplies pressurized hydraulic fluid to the steering circuit when a loss of hydraulic pressure is detected. Another secondary hydraulic pressure steering system comprises hydraulic accumulators for storing hydraulic pressure until needed. With smaller work vehicles, however, secondary hydraulic pressure systems may not be needed, as the vehicle can be manually steered by the operator even when hydraulic pressure is lost. This is accomplished because the fluid meter of the controller acts as a pump, supplying hydraulic fluid to the steering cylinders. Such a manual system is ineffective with larger vehicles due to the size of the fluid meter.

The Eaton Corporation of Cleveland, Ohio, through its Charlyn Division is currently developing a controller having a bypass fluid path around the fluid meter. The bypass fluid path is provided with a variable orifice structure. This bypass fluid path provides additional fluid to the steering cylinders that does not have to pass through the fluid meter. As such the controller may be provided with a smaller fluid meter than was previously necessary for a large machine. The smaller fluid meter is less costly thereby reducing the overall cost of the controller.

SUMMARY OF THE INVENTION

It is the object of the present invention to provide a simple secondary steering system that is automatically triggered and manually manipulated.

The present invention comprises a steering controller having the bypass fluid path. The controller is further provided with a means to prevent reverse fluid flow in the bypass fluid path from the control fluid ports to the inlet ports. The means to prevent reverse fluid flow may comprise a check valve, a two-position fluid actuated valve, or be formed as part of the valve configuration. The means to prevent reverse flow is necessary to prevent hydraulic short circuiting of the fluid meter when being used to pump hydraulic fluid. More specifically, the means to prevent reverse flow stops the fluid meter from pumping fluid through the bypass fluid path rather than through the control ports to the steering cylinders.

It is also necessary to supply the fluid meter with fluid to be pumped and prevent cavitation. As such a fluid supply path is positioned between the source of pressurized fluid and the reservoir. In this way the fluid supply path can be used to draw fluid from the reservoir to the fluid meter. The fluid supply path is also provided with a check valve to prevent the flow of fluid directly to the reservoir from the source of pressurized fluid. It is preferable that the fluid supply path be formed in the fluid controller, however, this path could be formed outside the controller between the incoming source of pressurized fluid line and the outgoing reservoir line.

DETAILED DESCRIPTION OF THE PREFERRED EMBODIMENT

Loader

Figure 1:
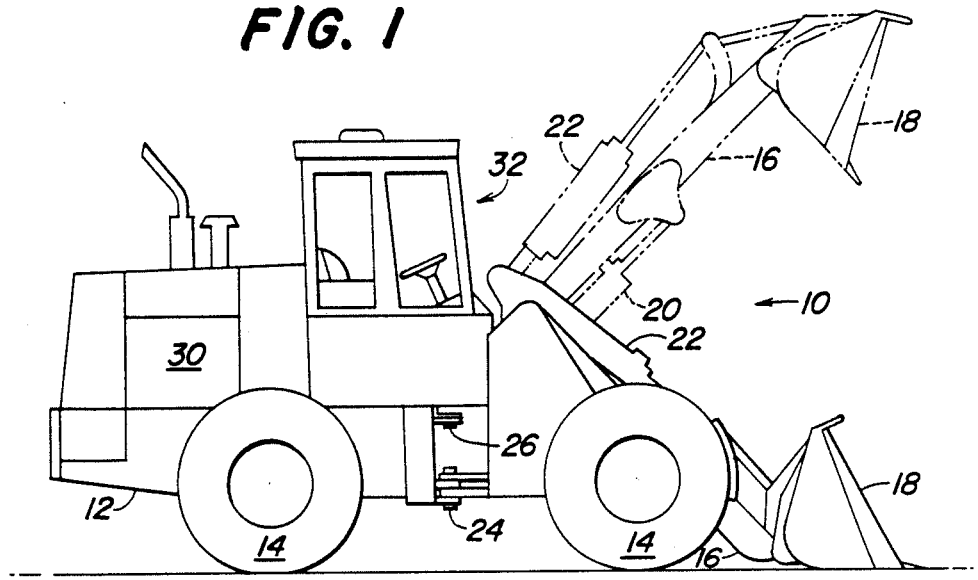
FIG. 1 is a side view of an articulated loader to which the present invention is particularly well suited.

The loader illustrated in FIG. 1 is a four-wheel drive articulated loader. Loader 10 comprises a supporting structure 12 having ground-engaging wheels 14. The front of the loader is provided with a movable boom assembly 16 at the end of which is pivotally mounted bucket 18. The boom is lifted by extending boom-lift actuator 20, and the bucket is pivoted by bucket-tilt actuator 22.

Figure 2:
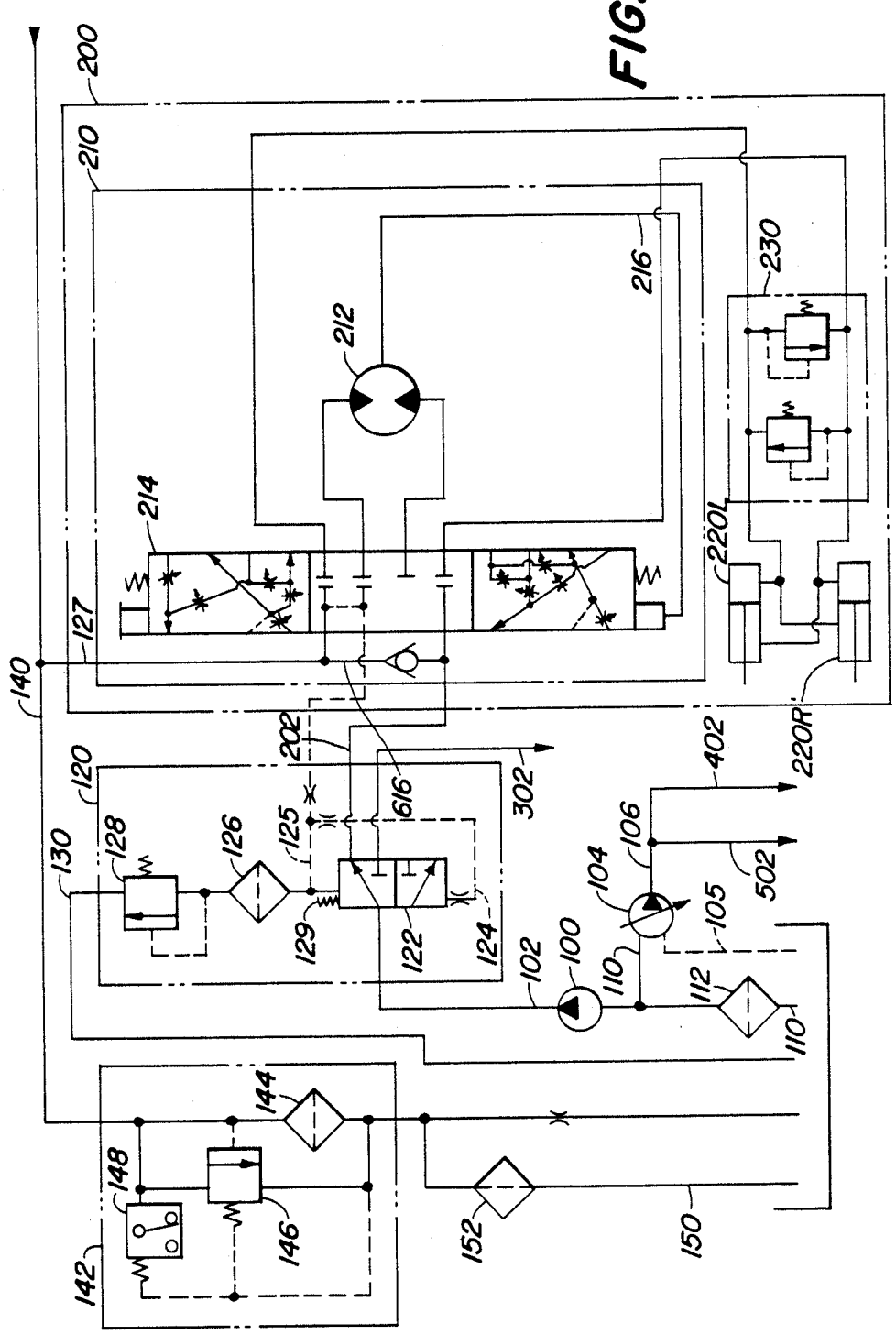
FIG. 2 is a hydraulic schematic of the overall steering system.
Figure 6:
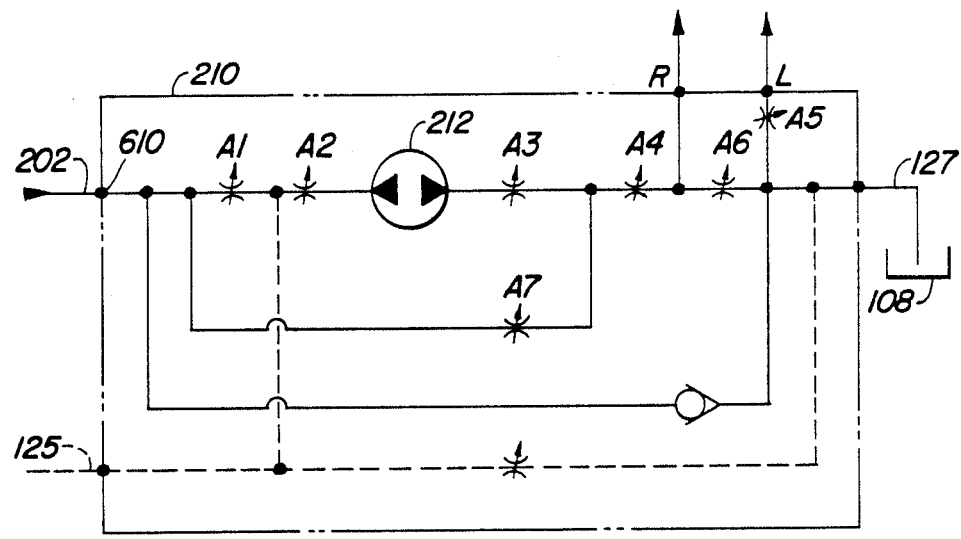
FIG. 6 is a simplified hydraulic schematic of the third embodiment of the controller in a right-hand turn.

The loader is articulated about vertical pivots 24 and 26 by a hydraulic steering circuit schematically illustrated in FIGS. 2 and 6 for the two different configurations. The loader is driven by an internal combustion engine that is housed in engine compartment 30. The internal combustion engine also drives hydraulic pumps for driving the working circuits of the loader and other hydraulically actuated systems. The operator controls the operation of the loader from cab 32.

Although the present invention is being described in regards to a loader, to which it is particularly well suited, it may also be used in other large work vehicles and in other nonvehicle applications.

Hydraulic System

The overall hydraulic steering system is schematically illustrated in FIG. 2, comprising an open center hydraulic system and a closed center hydraulic system. The total hydraulic system for the loader is disclosed in U.S. Patent application, Ser. No. 096,574, filed Sept 11, 1987, assigned to the present assignee and incorporated herein by reference. The open center hydraulic system is provided with hydraulic fluid by fixed displacement pump 100 which pumps hydraulic fluid through hydraulic line 102. The closed center hydraulic system is provided with hydraulic fluid by variable displacement pump 104 which is provided with a pressure sensing and compensating assembly for maintaining constant pressure in hydraulic line 106. Pump 104 is also provided with drain path 105 for returning leaking hydraulic fluid back to the sump. Both pumps are operatively interconnected in a piggybacked fashion to provide a compact pumping unit. The pumps are driven by the internal combustion engine through a suitable mechanical coupling.

The pumps draw hydraulic fluid from common sump 108 through a common hydraulic fluid suction line 110. Line 110 is provided with a screen 112 for removing large particulates from the hydraulic fluid being directed to pumps 100 and 104.

The hydraulic fluid output of pump 100 is directed through line 102 to priority valve assembly 120 which prioritizes fluid flow between steering assembly 200 and the loader assembly which is fluidically coupled to line 302. The priority valve assembly gives priority to the steering assembly, shutting off hydraulic fluid flow to the loader assembly in response to fluid demands of the steering assembly. The priority valve assembly comprises a spring biased two-position spool 122 that selectively directs fluid between the steering and loader assemblies. Spool 122 is hydraulically balanced between restricted hydraulic pressure sensing lines 124 and 125. When steering valve 210 is centered in a neutral position, hydraulic flow from supply line 202 through valve 210 is stopped, increasing hydraulic pressure in line 202 and sensing line 124. In the centered position, valve 210 couples sensing line 125 to pump return line 140 through line 127 reducing hydraulic pressure in sensing line 125. As such, the increased hydraulic pressure in line 124 overcomes the hydraulic pressure in line 125 and the biasing force of spring 129 to position spool 122 so that it can transmit hydraulic fluid to loader assembly supply line 302.

The priority valve assembly is also provided with a filter 126 and pressure relief valve 128 through which hydraulic fluid can be directed to sump return line 130. The sump return line receives hydraulic fluid from sensing line 125.

Hydraulic fluid exhausted from steering assembly 200 and the loader assembly is directed by sump return line 140 to sump 108. Sump return line 140 is provided with a return filter assembly 142 having filter 144, hydraulically balanced pressure relief valve 146 and hydraulically balanced pressure sensitive electrical switch 148. Hydraulic fluid is typically filtered by the filter and returned to sump 108. However, as the filter collects foreign material, the hydraulic pressure drop across the filter increases closing electrical switch 148. Upon the closing of electrical switch 148, an indicator light is triggered in the operator cab of the loader, alerting the operator that filter 144 should be cleaned or replaced. As the pressure drop continues to increase because of additional foreign material collected on the filter, pressure relief valve 146 opens, thereby providing a hydraulic flow path that bypasses the filter.

Hydraulic fluid sump return line 150 located downstream of the filter assembly is provided with oil cooler 152 for cooling oil being returned to sump 108.

The hydraulic fluid output of pump 104 is directed to a hydraulic pressure reduction assembly through hydraulic fluid supply line 402; and a brake assembly through hydraulic fluid supply line 502.

Steering assembly 200 receives hydraulic fluid through hydraulic line 202 from priority valve assembly 120. The hydraulic fluid is directed to infinitely variable steering controller 210. Controller 210 comprises multi-displacement fluid meter 212 and valve structure 214 which are operatively coupled to one another by mechanical follow up connection 216. Valve structure 214 comprises a main fluid path and may comprises a dampening fluid path. The dampening fluid path comprises a number of restricted passages that are used to dampen pressure spikes in the main fluid path. The steering control valve is more fully explained in U.S. patent application, Ser. No. 037,493, filed Apr. 13, 1987, now U.S. Pat. No. 4,781,219, in which the present inventor is one of the joint inventors therein, and which is incorporated herein by reference.

The main fluid path directs hydraulic fluid to steering hydraulic cylinders 220R and 220L for assisting in steering the loader. Crossover relief valves 230 are hydraulically located between control valve 210 and the steering cylinders 220R and 220L for providing pressure relief to the system.

Hydraulic Secondary Steering Circuit

Figure 3:
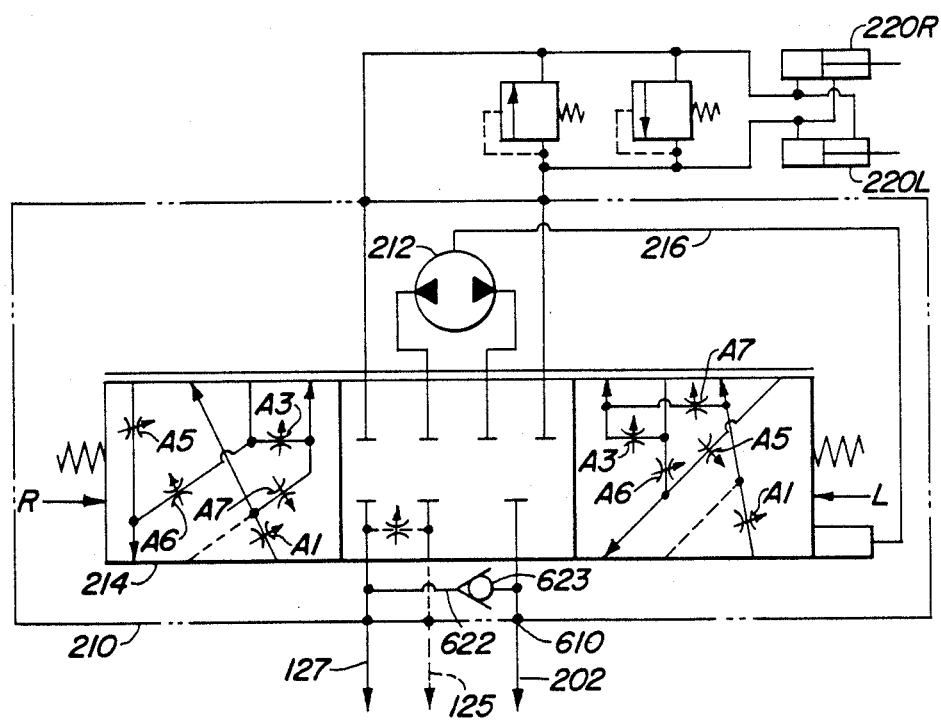
FIG. 3 is a hydraulic schematic of the controller.

The basic valve structure and construction of controller 210 are disclosed in U.S. patent application Ser. No. 037,493, filed Apr. 13, 1987, now U.S. Pat. No. 4,781,219, in which the present inventor is a joint inventor and which is incorporated herein by reference. It should be noted that the controller disclosed in U.S. patent application Ser. No. 037,493, now U.S. Pat. No. 4,781,219, discussed above, is substantially identical to the controller illustrated in FIG. 3, except that the valve structure illustrated in FIG. 3 is provided with a bypass fluid path, as discussed below, and a fluid supply path between the reservoir and the source of pressurized fluid.

Hydraulic fluid from supply line 202 is directed to inlet port 610 of controller 210. Valve structure 214 comprises a main fluid path comprising passages A1, A2, A3, A4 and A5, and a dampening fluid path comprising passage A6. Fluid from the main fluid path is transmitted directly to steering cylinders 220L and 220R and fluid meter 212. The fluid meter through mechanical follow-up assembly 216 further adjusts the variable orifice structures present in valve structure.

Figure 4:
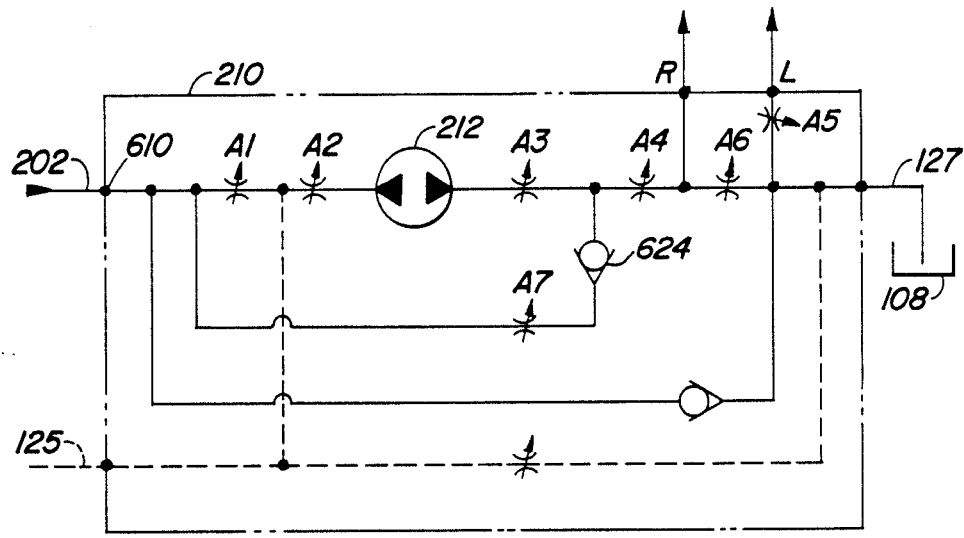
FIG. 4 is a simplified hydraulic schematic of the first embodiment of the controller in a right-hand turn.

The present valve structure is further provided with a bypass fluid path A7 having a variable orifice that supplements the fluid flow to the steering cylinders, thus reducing the size requirements for the fluid meter. To prevent short circuiting of the secondary hydraulic steering system when the fluid meter is being used to pump hydraulic fluid, it is necessary to provide a means to prevent the reverse flow of fluid within fluid path A7. In FIG. 4 the valve structure is configured in a right-hand turn. In this embodiment, the means for preventing reverse flow comprises check valve 624.

Figure 5:
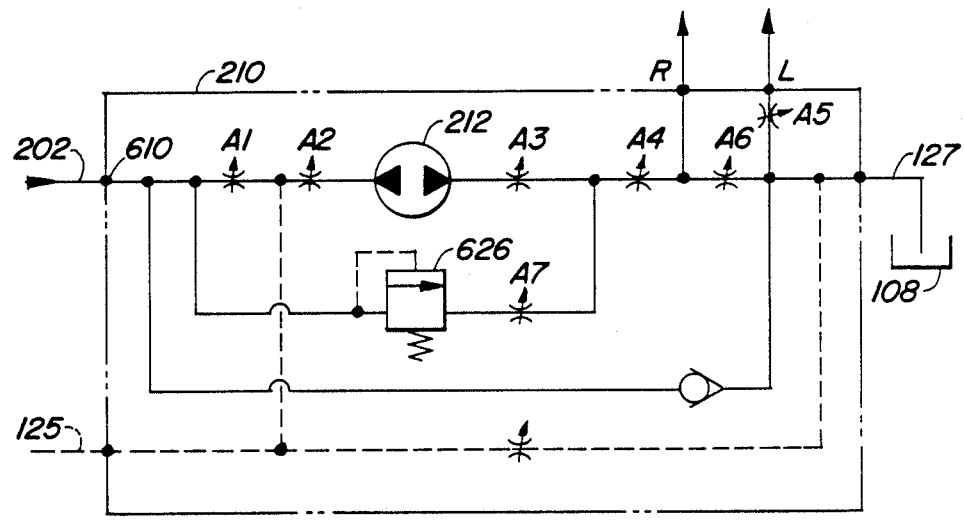
FIG. 5 is a simplified hydraulic schematic of the second embodiment of the controller in a right-hand turn.

In the second embodiment illustrated in FIG. 5, the means for preventing reverse flow comprises a two position fluid pressure sensing valve 626 which is spring biased into a closed position. Typically pressure in fluid supply line maintains valve 626 in its open position, however, when pressure is lost, valve 626 shifts to a closed position thereby preventing the reverse flow of fluid.

The third embodiment, illustrated in FIG. 6, comprises the operation of the variable orifice structure in path A7. The variable orifice in path A7 could be designed to close when the valve structure is operating at its maximum relative position. The flow through line A7 would approximate a bell-shaped curve with no flow when the valve structure is in its neutral position, increasing flow as the valve is initially shifted to its operating position, decreasing flow as the valve approaches its maximum operating position, and no flow as the valve reaches its maximum operating position. When fluid pressure is lost, the operator turns the steering wheel hard shifting the valve to its maximum operating position, effectively closing variable orifice A7 and preventing reverse flow in path A7.

To prevent cavitation and to supply the fluid meter with fluid when it is being used as a pump, controller 210 is provided with a fluid supply path 622. Fluid supply path 622 supplies fluid from reservoir 108 to inlet port 610. Path 622 is provided with check valve 623 which prevents the short circuiting of the controller when the controller is being operated in its typical or primary mode.

In normal operation, the operator by turning the steering wheel of the vehicle moves valve structure from a neutral position illustrated in FIG. 3, to an operating position, illustrated in FIGS. 4–6. The two operating positions define the direction of the turn and how pressurized hydraulic fluid will be directed to the steering cylinders. When hydraulic pressure is lost, the operator will still be able to steer the vehicle because by steering, the operator shifts the valve structure to its maximum operating position and starts to drive the fluid meter as a pump supplying pressurized hydraulic fluid to the steering cylinders. The means for preventing reverse flow in line A7 prevents hydraulic short circuiting of the fluid meter and line 622 will provide fluid from reservoir to the fluid meter.

The invention should not be limited to the three above-described embodiments, but should be limited solely by the claims that follow.

I claim:

1. A controller operable to control the flow of fluid from a source of pressurized fluid to a fluid pressure operated device, the controller being of the type including a housing defining an inlet port for connection to a source of pressurized fluid, a return port for connecting to a reservoir, and first and second control fluid ports for connection to the fluid pressure operated device;

valve means disposed in the housing and defining a neutral position and a first operating position;

the housing and the valve means cooperating to define a main fluid path communicating between the inlet port and the first control fluid port and between the second control fluid port and the return port when the valve means is in the first operating position;

fluid actuated means for imparting follow-up movement to the valve means proportional to the volume of fluid flow through the main fluid path; the main fluid path including a first variable flow control orifice disposed between the inlet port and the first control fluid port, and having its minimum flow area when the valve means is in the neutral position, and an increasing flow area as the valve means is displaced from the neutral position toward the first operating position, the first variable flow control orifice having its maximum flow area when the valve means is moved to its maximum displacement from said neutral position; and a bypass fluid path for directing fluid from the inlet port to one of the control fluid ports bypassing the fluid actuated means for imparting follow-up movement to the valve means; characterized by:

the bypass fluid path is provided with means for preventing reverse fluid flow in the bypass fluid path from the control fluid ports to the inlet port when pressurized fluid is not being supplied to the inlet port from the source of pressurized fluid; and a fluid supply path for supplying fluid to the fluid actuator means for imparting follow-up to the valve means when pressurized fluid is not being supplied to the inlet port from the source of pressurized fluid.

2. A controller as claimed in claim 1 characterized by the fluid supply path being in fluid communication with the inlet port and the reservoir, the fluid supply path is adapted and constructed to transmit fluid from the reservoir to the inlet port.

3. A controller as claimed in claim 2 charcterized by a fluid supply check valve located in the fluid supply path to prevent fluid from the source of pressurized fluid flowing directly to the reservoir through the fluid supply path.

4. A controller as defined in claim 3 characterized by the means for preventing reverse fluid flow in the bypass fluid path comprising a bypass path check valve.

5. A controller as defined by claim 3 characterized by the means for preventing reverse fluid flow in the bypass fluid path comprising a two-position fluid pressure actuated valve.

6. A controller as defined by claim 3 characterized by the means for preventing reverse fluid flow in the bypass fluid path comprises a second variable flow control orifice located in the bypass fluid path whereby the second variable flow control orifice has a minimum flow area when the valve means is in its neutral position, an increasing flow area as the valve means is initially displaced from its neutral position to its operating position and a minimum flow area when the valve means is moved to its maximum flow area.

* * * * *